Nov. 5, 1935.    T. McLEOD    2,019,620
SHOCK ABSORBER
Filed Jan. 19, 1935
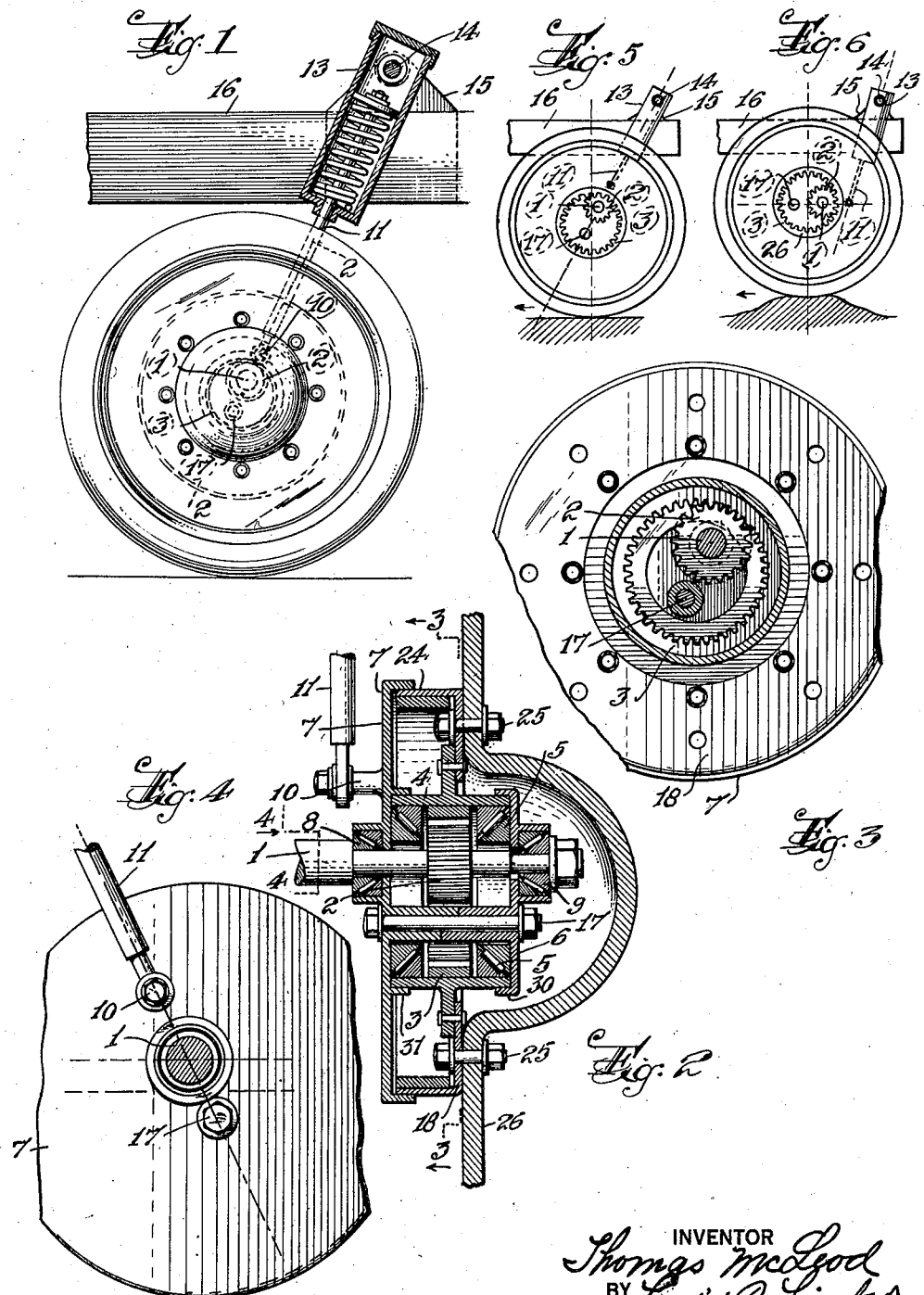
INVENTOR
Thomas McLeod
BY Fredk C. Fischer
ATTORNEY Patented Nov. 5, 1935

2,019,620

UNITED STATES PATENT OFFICE 2,019,620

SHOCK ABSORBER

Thomas McLeod, Elizabeth, N. J.

Application January 19, 1935, Serial No. 2,507

6 Claims. (Cl. 180—10)

This invention relates to shock absorbers for vehicles, and more particularly to shock absorbers adapted to be used on driving wheels for automotive vehicles.

Heretofore, shock absorbing devices of the type herein considered have been adapted for use only on the front wheels or non-driving wheels of a vehicle, said shock absorbers being intended to compensate for irregularities in the road over which the vehicle travels. While such shock absorbers have been effective for the front or non-driving wheels, obviously, the arrangement has been unsatisfactory in that the rear or driving wheels are subjected to the shocks resulting from irregularities in the road and the desired evenness of operation has not been attained.

It is an object of this invention to provide a shock absorber device which can be applied to the rear or driving wheels of an automotive vehicle as well as to the front or non-driving wheels so that all four of the wheels of a vehicle will be adequately protected from shock.

A further object is the provision of a driving and shock absorbing device for automotive vehicles, which eliminates the necessity of the well known body springs heretofore employed on vehicles, between the axle and the chassis of the vehicle.

These and other advantageous objects which will later appear are accomplished by the simple and practical construction and arrangement of parts hereinafter described and exhibited in the accompanying drawing, forming part hereof, and in which:

Fig. 1 is an elevational view of a wheel equipped with my shock absorbing and driving device, of which certain parts are shown in section, Fig. 2 is a sectional view taken on the line 2—2 of Fig. 1, Fig. 3 is a sectional view taken on the line 3—3 of Fig. 2, Fig. 4 is a sectional view taken on the line 4—4 of Fig. 2, and Figs. 5 and 6 are diagrammatic views showing the operation of the device in going over rough portions of a road.

Referring to the drawing, the device is shown to comprise an automobile axle or shaft 1 having fixed thereon a pinion 2 engaging an internal gear 3 mounted within a cylindrical housing 4, the latter being provided with roller or ball bearings 5 to facilitate the rotation thereof.

Housing 4 is supported by annular flanges 30 and 31, respectively integral with a front closure plate 6 and a rear closure plate 7 carrying roller bearings 8 and 9 to facilitate rotation of the axle 1 with respect thereto. The rear closure plate 7 has projecting therefrom a lug 10 to which is pivotally connected a rod 11, the upper end of which is encircled by a compression spring 12 positioned in a cylinder 13, which is pivotally mounted at 14 to a bracket 15 supported by the chassis 16.

The closure plates 6 and 7 are firmly held together by a bolt 17 and shaft 1 so that they act as a unit and are independent of the movement of the cylindrical housing 4.

In operation, power from the shaft 1 will be transmitted by the pinion 2 to the internal gear 3 and thence to the housing 4, to which is secured an annular member 18 having a flange 24, forming a brake drum. Secured to the annular member 18 by means of a plurality of bolts 25 is a wheel 26.

From the above description it will be seen that no motion is transmitted either by the power of the motor or by the drag of the wheel proper to the chassis. However, when the wheel encounters an obstruction, (see Figs. 5 and 6), due to the fact that it is mounted eccentrically on the shaft with respect to the center line of the power shaft 1, it will have a tendency to rise vertically along its center line. The rod 11 and spring assembly 12 and 13 being mounted on the back closure plate 7 to one side of the vertical center line of the wheel, the lower end of the rod will be pulled down against the action of the spring 12 as shown in Fig. 6 without transmitting said motion to the chassis itself. Upon passing the obstruction the wheel will resume its original position without the action having been transmitted to the chassis. Should there be an extra load placed on the vehicle itself, as for instance a heavy weight placed on the truck, or as in starting or stopping, the usual jar or wrench caused thereby will be taken up by the rod and spring and will not be transmitted to the axle.

In the starting and stopping of the motor car, the device has a cushioning effect which prevents wear and tear on the wheel and axle; and when making a sudden stop the device prevents jolts and other annoying actions. As the speed of the car increases, the rhythmic action of the springs due to the internal gear and pinion serves to accelerate the speed of the movement of the springs, and prevents sluggish action of the springs when going over rough roads.

From the above description it will be seen that I have provided a simple and effective device for absorbing shocks in the motor cars due to the rough roads and sudden jolts, and heavy weights.

When my device is used all driving mechanism such as axle, and the like can be carried by and secured to the chassis, thereby eliminating the bouncing of the same, the wheels being balanced by the shock absorbing springs. When it is desired to use the device on the front wheels or non-driving wheels of the car, the pinion and internal gear can be eliminated.

The foregoing disclosure can be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent, is:

1. In a shock absorbing and driving device, a shaft, a plate rotatably mounted on the shaft, a pinion fixed to said shaft, a housing rotatably mounted on said plate having an internal gear engaging said pinion, a wheel attached to said housing, a rod pivotally connected to said plate, said rod being offset from and normally at an angle to the vertical center line of the wheel, a chassis supporting said shaft, a casing pivotally mounted on said chassis and receiving said rod, and a compression spring positioned in said casing and encircling said rod to resist the downward movement thereof.

2. In a shock absorbing and driving device, a shaft, a plate rotatably mounted on the shaft, a pinion fixed to said shaft, a housing rotatably mounted on said plate and having an internal gear engaging said pinion, a wheel attached to said housing, a rod pivotally connected to said plate, said rod being offset from and normally at an angle to the vertical center line of the wheel, and resilient means to resist downward movement of said rod.

3. In a shock absorbing and driving device, a shaft, a plate rotatably mounted on the shaft, a pinion fixed to said shaft, a housing rotatably mounted on said plate and having an internal gear engaging said pinion, a wheel attached to said housing, said internal gear being of greater diameter than the pinion so that the wheel is mounted eccentrically relative to the shaft, and means pivotally attached to the plate to resiliently resist rotary movements of the plate, said means being offset from and normally at an angle to the vertical center line of the wheel.

4. In a shock absorbing and driving device, a shaft, a plate rotatably mounted on the shaft, an annular flange projecting from said plate, a housing rotatably supported by the flange on the plate, a pinion fixed to said shaft, said housing having an internal gear engaging said pinion, an annular member secured to said housing, said annular member having a flange forming a brake-drum, a wheel attached to said annular member, said internal gear being of greater diameter than the pinion so that the wheel is mounted eccentrically relative to the shaft, and means pivotally attached to the plate to resiliently resist rotary movement of the plate, said means being offset from and normally at an angle to the vertical center line of the wheel.

5. In a shock absorbing device, a shaft, a plate rotatably mounted on the shaft, a pinion fixed to said shaft, a housing mounted on said plate, and having an internal gear engaging said pinion, a wheel attached to said housing, said wheel being mounted eccentrically relative to the shaft, a rod pivotally connected to the plate, said rod being offset from and normally at an angle to the vertical center line of the wheel, a chassis, a casing pivotally mounted on said chassis and receiving said rod, and resilient means positioned in the casing to resist downward movement of the rod.

6. In a shock absorbing and driving device, a shaft, a pinion fixed to the shaft, a housing having an internal gear engaging said pinion, a rear closure plate for the housing, a front closure plate for the housing, annular flanges on said front and rear closure plates rotatably supporting said housing, means connecting said rear and front closure plates, a wheel attached to the housing, said wheel being mounted eccentrically relative to the shaft, a rod pivotally connected to said rear closure plate, said rod being offset from and normally at an angle to the vertical center line of the wheel, and resilient means to resist downward movement of said rod.

THOMAS McLEOD.